Patented Apr. 26, 1949

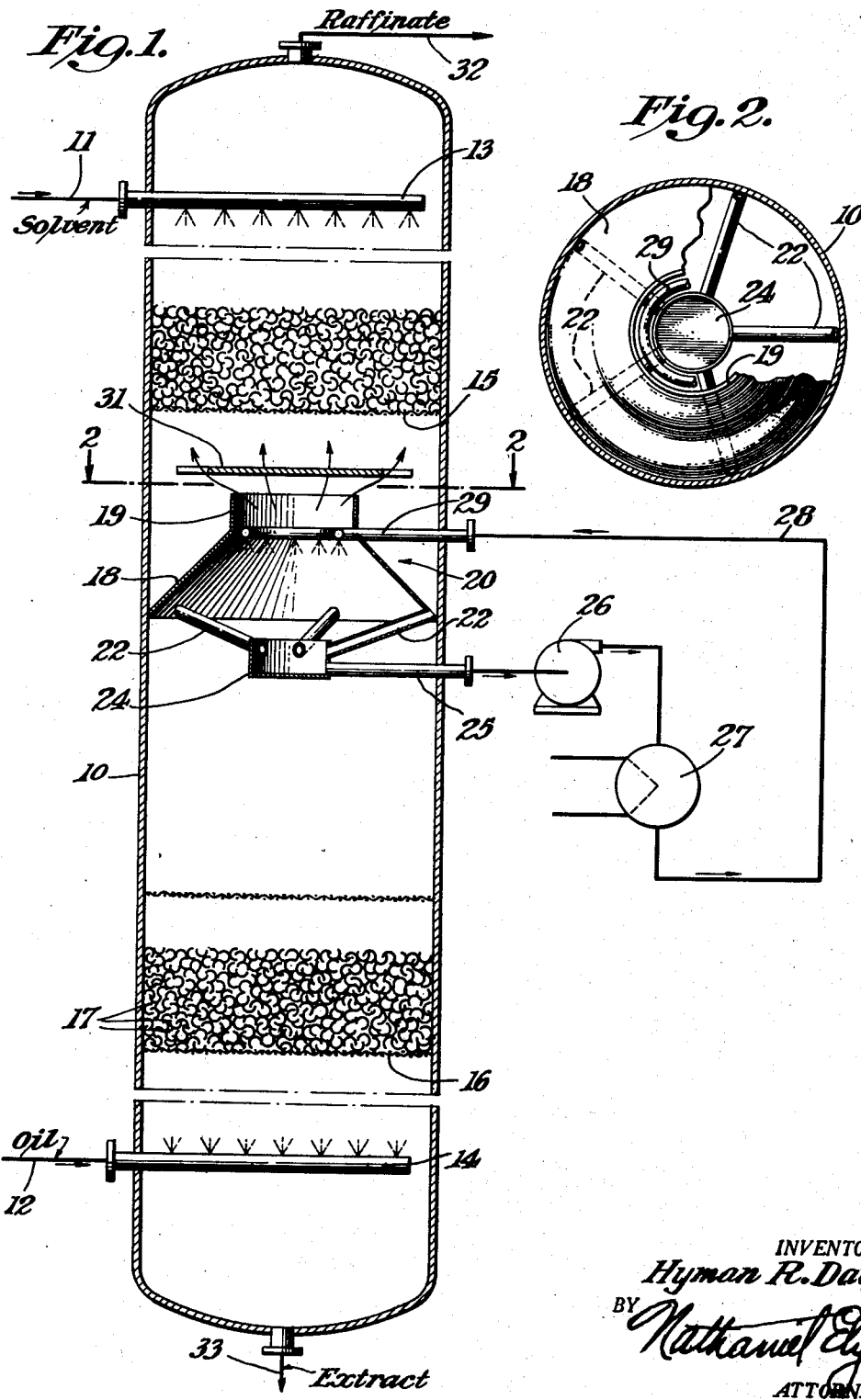

2,468,044

UNITED STATES PATENT OFFICE 2,468,044

SOLVENT EXTRACTION PROCESS AND APPARATUS

Hyman R. Davis, Jackson Heights, N. Y., assignor to The Lummus Company, New York, N. Y., a corporation of Delaware Application September 6, 1946, Serial No. 695,219

3 Claims. (Cl. 196—14.49)

This invention relates to apparatus for, and a method of treating one liquid countercurrently with another and has particular reference to the countercurrent treatment of hydrocarbon oils with a liquid, such as a selective solvent.

This invention broadly contemplates effecting countercurrent treatment of liquids in a packed tower, wherein at successive points in the tower the liquid phases are separated, subjected to mixing, preferably cooled, and returned to the tower at or near the point of separation as will be more fully described.

In the treatment of hydrocarbon oil, such as mineral lubricating oil, with a selective solvent, such as furfural, the oil is introduced to the lower portion of a packed tower, while the solvent is introduced to the upper portion thereof. Oil and solvent move countercurrently through the tower and in doing so form within the tower the extract and raffinate phases. The extract phase is rich in aromatic and naphthenic type constituents of the oil and accumulates in the bottom of the tower, from which it is continuously withdrawn.

The raffinate phase, on the other hand, comprises the more paraffinic and insoluble constituents of the oil mixed with a small portion of the solvent. This raffinate phase accumulates in the upper portion of the tower and is continuously withdrawn therefrom.

The present invention involves providing, at intervals within the tower, preferably between succeeding sections of packing material, means for separating the extract and raffinate phase liquid, subjecting it to intimate mixing, and cooling and returning it to the tower.

By these means, close control of the contact between oil and solvent is effected. The overall effect is to product within the extraction tower conditions somewhat similar to those prevailing in a stage counterflow operation, as carried out in a series of separate mixing and settling vessels.

The purpose of the invention, therefore, is to combine in a countercurrent extraction system the simplicity of operation permitted in a conventional packed tower and the extractive efficiency of a stage operation.

Further objects and advantages of my invention will appear from the following description of a preferred form of embodiment thereof taken in connection with the attached drawing in which:

Fig. 1 is a substantially central vertical section with parts diagrammatically shown of the extraction tower.

Fig. 2 is a horizontal cross section substantially on the line 2—2 of Figure 1.

In accordance with my invention the extraction column generally indicated at 10 is preferably a vertical cylindrical vessel to which a solvent, such as furfural, is introduced through an inlet 11 to the upper part of the tower, while the oil to be treated is introduced through an inlet 12 near the bottom. Sprays or spargers or other distributing devices 13 and 14 will be provided for the appropriate distribution of the solvent and the oil through the column. The column is provided with a screen 15, in the upper part of the column, for receiving suitable packing, such as nests of Raschig rings, or other material commonly used as packing, and which has a large surface area of contact. The lower portion of the column is similarly provided with a screen 16 also adapted for supporting a series of packing elements generally indicated at 17.

Within the enlarged space between the upper and lower packing sections, I provide a conical baffle 18 which extends to the wall of the tower 10 and has a central upwardly extending cylindrical neck 19. Such a construction provides a chamber 20 which is adapted to catch and retain all liquids flowing downward from the upper portion of the tower.

The conical wall of the baffle 18 may be provided with a series of conduits 22 each leading to a central trap 24 which in turn is provided with a drawoff pipe 25 so that all of the liquids flowing downward can be removed through the pipe 25. The pipe 25 in turn is connected to pump 26 which in addition to drawing off the liquid also acts as a mixer for the liquid material which it distributes throughout the cooler 27, and returns through line 28 to the tower.

The line 28 is connected with a distributing device 29 maintained within the central cylindrical neck of the baffle 18 in such a manner that all of the liquid previously drawn from outside of the baffle and cooled is now permitted to pass downwardly in spray form within the baffle.

The phase liquid collecting in the trough or chamber 20 comprises mainly extract phase or heavy gravity material rich in solvent and this passes again countercurrent to the rising liquid that passes upward through the cylindrical neck 19 on the baffle 18 and around the baffle 31 which prevents the solvent from passing directly downward through the tower.

Thus the arrangement of the baffle is such, that there is not only an intimate mixing, but there is a complete assurance that the solvent from the upper part of the tower cannot pass directly through the mixed phase portion to the bottom of the tower.

The cooler 27 effectively maintains the desired temperature gradient from top to bottom within the tower, the lower portion of the tower adjacent the oil feed being at approximately 220° F. and the top of the tower at the raffinate stream removed at 32 being at approximately 290° F. If it is assumed that the temperature at the liquid drawoff 25 is approximately 270° F., the liquid can be cooled by the cooler 27 to 240° F. thus maintaining a temperature relation in the central part of the tower of 240° F. although the temperature of the liquid itself which is cooled in the trough 20 is 270° F.

It is contemplated that selective solvents other than furfural may be employed as, for example, phenol, nitrobenzene, aniline, benzaldehyde, etc., and the oil treated may comprise lubricating oil stocks or other petroleum fractions.

While I have shown a preferred form of embodiment of my invention, I am aware that many modifications and variations may be made thereto, and I, therefore, do not wish to be limited except by the scope and spirit of the description herein and the claims appended hereto.

I claim:

1. In the countercurrent treatment of hydrocarbon oil with a solvent to separate the oil into extract and raffinate phases, the method comprising passing the oil downwardly and the solvent upwardly through a packed vertical tower, at vertical intervals throughout the tower segregating the oil and solvent into intermediate extract and raffinate phases, withdrawing at the central part of the tower a segregated relatively warm intermediate extract phase which is lean in oil and rich in solvent, cooling said withdrawn intermediate extract phase and returning it to an intermediate portion of the tower in such a manner that the cooled intermediate extract phase flows downwardly countercurrently to the oil to increase the strength of the extract phase without contacting the segregated relatively warm intermediate extract phase, and removing the extract phase from the lower part of the tower.

2. In a packed tower for effecting countercurrent contact between a liquid and a selective solvent, the combination comprising an enlarged settling space including a fully baffled trap between sections of packing material whereby all liquid passing downward in the tower is collected thereon, means for withdrawing all liquid collected on said trap, means for indirectly exchanging heat with said withdrawn liquid, and means to return said liquid to the tower above the point of withdrawal and within the baffled trap whereby said returned liquid will pass on downward in the tower countercurrent to liquid passing upward through said baffled trap.

3. A packed tower as claimed in claim 2 in which said trap includes a truncated cone the large edge of which forms a liquid reservoir with the tower, said cone having a central opening and a baffle member surmounting the cone and preventing flow of liquid through the cone to the lower part of the tower, the liquid return means being located below the baffle member and within the opening of the cone.

HYMAN R. DAVIS.

REFERENCES CITED

The following references are of record in the file of this patent:

UNITED STATES PATENTS

| Number | Name | Date |
| --- | --- | --- |
| 2,064,422 | Fenske et al. | Dec. 15, 1936 |
| 2,176,429 | Kiersted | Oct. 17, 1939 |
| 2,216,602 | Ragatz | Oct. 1, 1940 |